April 21, 1936.  J. ROBERT  2,037,822
PROCESS AND APPARATUS FOR PRODUCING VARIEGATED ROOFING
Filed Aug. 26, 1933
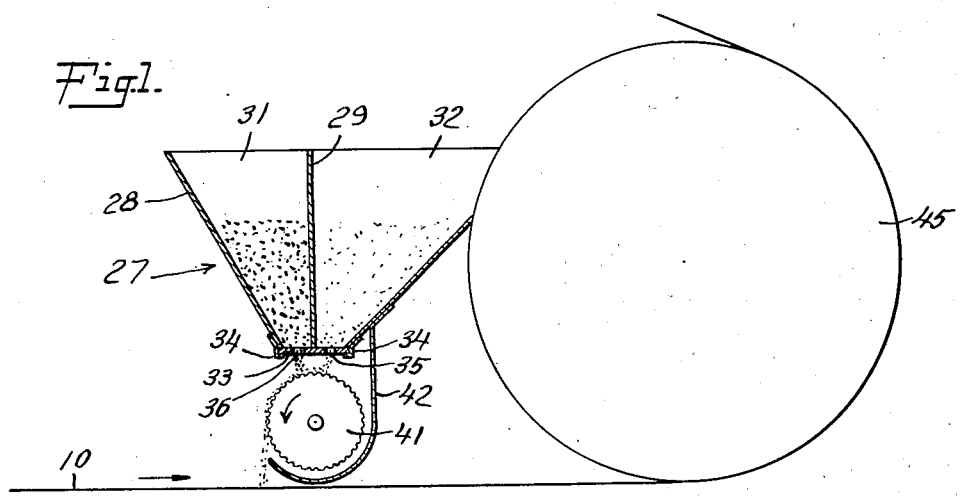
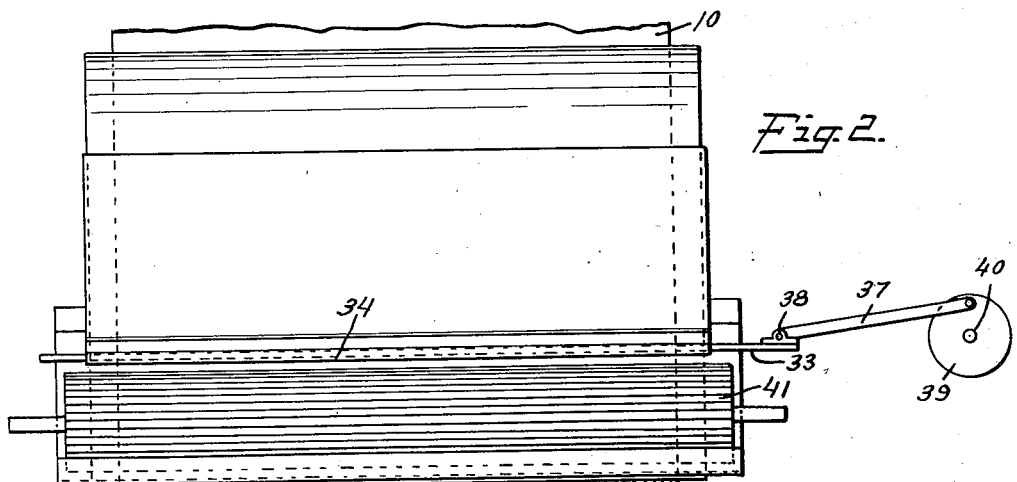
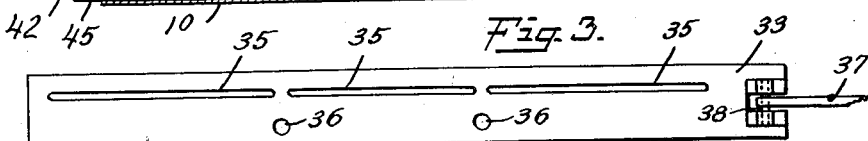
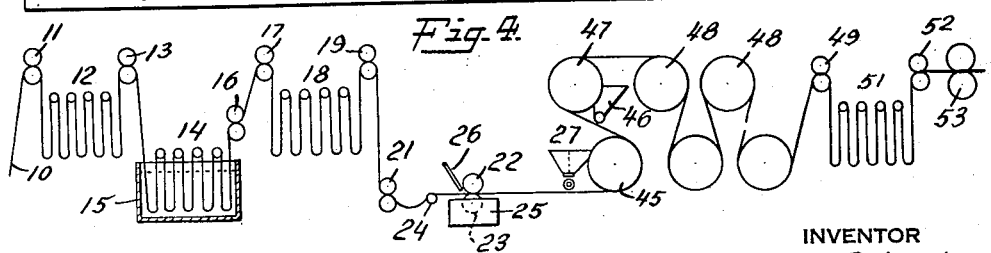
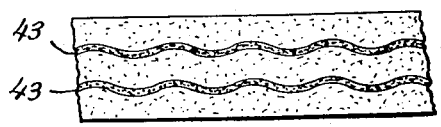
INVENTOR
John Robert
BY
ATTORNEY Patented Apr. 21, 1936

2,037,822

UNITED STATES PATENT OFFICE 2,037,822

PROCESS AND APPARATUS FOR PRODUCING VARIEGATED ROOFING

John Robert, Chicago, Ill., assignor to The Barrett Company, New York, N. Y., a corporation of New Jersey Application August 26, 1933, Serial No. 686,935

5 Claims. (Cl. 91—43)

This invention relates to roofing, and more particularly to the surfacing of roofing with differently colored granular material to produce roofing presenting a variegated appearance. The term "roofing" is used herein in a broad sense and is intended to include not only the usual felt base composition roofing, whether employed for covering roofs, walls, or other surfaces, but also other covering material, such as that made from a mastic or adhesive composition and adapted to be surfaced with granular material.

It has been proposed to surface roofing by applying contiguous, longitudinal, parallel stripes or bands of differently colored granular material to a roofing sheet. To create wavy stripes on the roofing sheet, the hopper from which the granular material was fed onto the sheet was reciprocated transversely of the direction of movement of the sheet. To get away from the monotonous regularity of such striped sheets, it has been suggested that granular material be applied in two steps, the granular material applied during the first step covering selected areas and granules of a contrasting color applied during the second step covering the entire sheet, including the portions of the sheet covered in the first step. Such procedure, it will be appreciated involves the excessive handling and waste of granular material. Furthermore, considerable excess of granular material of different colors is applied. This must be removed from the sheet and recovered. It is difficult and requires a complicated mechanical layout to recover such excess granules without mixing the colors and the resultant irregular blend is of diminished value for surfacing.

It has also been proposed to simultaneously apply to a roofing sheet two streams of granular material, each stream of a width sufficient to completely cover the sheet. One stream was fed from a hopper having partitions dividing it into compartments containing differently colored granular material so that a striped effect was produced. The other stream was fed from a hopper containing a solid color of granular material which blended with and masked to some extent the color of the stripes produced by the granular material fed from the first-mentioned hopper. Such procedure also involves excessive handling and waste of granular material.

It is an object of this invention to provide a one-step surfacing procedure producing variegated appearing roofing which procedure, as compared with known surfacing processes, reduces the handling of the granular material to a minimum. Another object of this invention is to provide apparatus of comparatively simple design and efficient in operation for practicing such procedure. Other objects and advantages of this invention will be apparent from the following detailed description taken in connection with the accompanying drawing, in which—

Fig. 1 is a vertical section, partly in elevation, through surfacing apparatus embodying this invention;

Fig. 2 is a front elevation, partly in section, of the apparatus of Fig. 1;

Fig. 3 is a fragmentary plan view of a valve plate for controlling the discharge of granular material from the hopper of Fig. 1;

Fig. 4 is a side elevation, somewhat diagrammatic in character, showing equipment for making composition roofing; and Fig. 5 is a fragmentary plan view of roofing surfaced in accordance with this invention.

Referring to the drawing, with particular reference to Fig. 4, a sheet of fibrous material 10, which may be, and preferably is, of the usual roofing felt made of rag fiber, paper stock, or other fibrous material, with or without suitable fillers, as well known in the roofing art, is fed by feed rolls 11 from the usual paper making machine or felt roll into a looping device 12. From this looping device, rolls 13 feed the sheet into any suitable type of saturating apparatus indicated generally by the reference numeral 14. Saturating tank 15 may contain suitable cementitious waterproofing composition such as asphalt or other bituminous material utilized for the impregnation and saturation of roofing felts.

Feed rolls 16 and 17 feed the saturated sheet to a second looping device 18. The passage of the saturated fibrous sheet or base through the looping device 18 gives the saturant an opportunity to impregnate the base and to dry thoroughly. Feed rolls 19 and 21 feed the saturated sheet from the looping device 18 to the coating apparatus involving a pair of coating rolls 22, 23. Feed rolls 21 are preferably driven at a slightly greater peripheral speed than the coating rolls 22, 23; slack accumulating between the driven rolls 21 and the guide roll 24, over which the sheet passes before passing over the coating roll 23. Coating roll 23 is rotatably mounted in a tank 25 which may contain bituminous material, such as asphalt or other cementitious waterproofing substance suitable for coating roofing felt. Bituminous material, such as asphalt, may be applied to the top of the sheet by means of a pipe 26 having a spout of a width approximately equal to that of the sheet. As the sheet passes between the coating rolls 22, 23, the underside is completely coated by roll 23. The coating material delivered by pipe 26 is spread uniformly over the top side of the sheet by the coating roll 22, excess coating material passing over the edges of the sheet and draining into the tank 25.

Immediately after leaving the coating rolls 22, 23, and while the coating material is still soft and tacky, the coated sheet passes under the surfacing apparatus indicated generally by the reference numeral 27. This surfacing apparatus comprises a hopper 28 preferably of a length equal to the width of the roofing sheet 10. A partition 29 extending longitudinally of the hopper 28 divides the hopper into two compartments, 31, 32, one in back of the other. A valve plate 33 is reciprocably mounted in a pair of supports 34 secured to the side walls of the hopper 28. Valve plate 33 is arranged to control the discharge of granular material from both compartments 31, 32.

As shown in Fig. 3, valve plate 33 is provided with two sets of spaced openings, the opening of one set being identified by the reference character 35 and those of the other set by the reference numeral 36. Openings 35 are preferably made in the form of long narrow slots and the relatively small openings 36 are disposed in the valve plate 33 opposite the portions of the plate between the spaced openings 35. Openings 35 are individual to the compartment 31 while the openings 36 are individual to the compartment 32. Valve plate 33 may be reciprocated by a lever 37 having one end pivotably secured as at 38 to the valve plate 33 and the other end fastened to a disc or crank 39 keyed to a shaft 40. Shaft 40 may be rotated by an electric motor (not shown) or other suitable source of power. Rotation of the shaft 40 through lever arm 37 causes reciprocation of the valve plate 33 across the width of the moving web 10.

A fluted distributing roll 41 is preferably rotatably mounted beneath the valve plate 33 and above the moving web 10. Secured to a wall of a hopper 28 and extending downwardly and circumferentially about the distributing roll 41, but spaced therefrom, is a plate member 42. Grit delivered to roll 41 and gravitating in a right hand direction, viewing Fig. 1, will be caught by this plate member and prevented from falling onto the moving sheet 10.

In operation, grit, such as crushed slate, rock, or other mineral granules, of different colors, coarseness, or other characteristics is supplied to the compartments 31, 32. The grit gravitates through the openings 35, 36 forming two sets of streams in vertical parallel planes, one set of streams being formed by the grit flowing through the narrow slots 35 and the other set of streams by the grit flowing through openings 36. The streams of one set are staggered with respect to those of the other set and the side edges of the streams of one set overlap to a slight extent the side edges of the streams of the other set. Upon reciprocation of the valve plate 33 by rotation of shaft 40, which preferably occurs continuously during the operation of the surfacing apparatus, each set of streams is moved transversely within its plane of flow; i. e., the streams are moved transversely so that their longitudinal axes are changed continuously by the reciprocation of the valve plate 33.

Both sets of streams gravitate from the compartments 31, 32 onto the distributing roll 41. Rotation of the roll showers the granular material or grit therefrom in a composite continuous stream in which, due to the reciprocation of plate 33, the position of those granules constituting the marginal portions of the streams is continuously changing. This continuous stream, which, it will be noted, has continuously changing veins (due to the reciprocation of the valve plate 33) of grit of a characteristic different from that of the main body of grit running through the main body of grit is fed onto the roofing completely covering the same and resulting in the formation of wavy bands 43 (Fig. 5) formed by the changing veins of grit. The marginal portions of these wavy bands are constituted of a blend of granules produced by the mixing of the differently colored granules from compartments 31, 32.

After being surfaced, as hereinabove described, the surfaced sheet passes about a reversing roll 45 which functions to partially embed the mineral granules in the plastic coating. Any excess granules fall from the surfaced sheet into the compartment 32 of hopper 28. If it is desired to apply a solid color of granules to the sheet from compartments 32, a separate hopper may be provided for receiving the excess granules falling off from the surfaced sheet.

In the continued passage of the surfaced sheet, it travels next under a hopper 46. Powdered talc, mica, or other anti-stick composition capable of rendering the back of the sheet non-cementitious is disposed in hopper 46 and is discharged therefrom onto the coating on the back of the sheet in the form of a talc surfacing layer covering substantially the entire width of the sheet. The talc covered sheet then passes over reversing roll 47 which partially embeds the talc in the sealback coating and imparts a smooth surface to the back of the sheet. Excess talc falls from the sheet as it passes from reversing roll 47 to the first of a series of calender rolls, each identified by the reference character 48. From the calender rolls 48, the sheet may be fed by feed rolls 49 through looping device 51 where the coated and surfaced product is given an opportunity to cool. Feed rolls 52 may feed the surfaced sheet into a winding machine where it may be wound into rolls which are shipped or used as the desired roll roofing product or these feed rolls may feed the surfaced sheet into cutting cylinders 53 for cutting the sheet into individual or strip shingles. Distributing roll 41 may be driven from any suitable source of power such as an electric motor (not shown). Preferably, however, the drive for roll 41 is geared to that for rolls or drums 47 and 48, which pull the sheet through the apparatus so that the speed of rotation of roll 41 and consequently the velocity of the grit discharged by this roll onto the sheet are proportional to the speed of movement of the sheet through the apparatus.

Since certain changes in carrying out the above process and certain modifications of the apparatus may be made without departing from the scope of this invention, it is intended that all matter contained in the above description or shown in the accompanying drawing shall be interpreted as illustrative and not in a limiting sense.

I claim:

1. The process of surfacing roofing which comprises separately feeding two staggered sets of streams of freely falling granular material of different characteristics in different planes, the width of said streams being such that the streams of one set overlap the streams of the other set, moving said streams transversely, causing said streams to combine to form a composite stream, a portion of which is composed substantially entirely of granular material of one of said first mentioned streams, a second portion of which is composed substantially entirely of granular material of the other of said first mentioned streams and a third portion of which is composed of a mixture of the granular material of said streams.

2. The process of surfacing roofing which comprises a set of streams of freely falling granular material in one plane, feeding another stream of freely falling granular material of different characteristics in another plane, said last named stream being staggered with respect to said first mentioned set of streams, the width of said streams being such that the streams of said set overlap said last named stream, moving said streams transversely, and causing said streams to combine to form a composite stream, a portion of which is composed substantially entirely of granular material of said set of streams, a second portion of which is composed substantially entirely of granular material of said last named stream and a third portion of which is composed of a mixture of the granular material of said streams.

3. Apparatus for surfacing roofing which comprises in combination a plurality of sources of granular material, means for feeding a plurality of sets of streams from said sources in different vertical planes with the individual streams of each set staggered with respect to those of another set, the streams of each set being somewhat wider than the spaces between the streams of the other set whereby the streams overlap, means for moving said streams transversely within their planes of movement, means for combining said sets of streams to form a composite stream, and means for feeding said composite stream onto a moving roofing web.

4. Apparatus for surfacing roofing which comprises in combination, a plurality of sources of granular material, means for feeding a set of streams from one of said sources in one vertical plane, means for feeding a stream from another of said sources in a different vertical plane, said last named stream being staggered with respect to the streams of said set and overlapping the streams of said set, means for moving said streams transversely within their planes of movement, means for combining said set of streams and said last named stream to form a composite stream, and means for feeding said composite stream onto a roofing web.

5. Apparatus for surfacing roofing which comprises, in combination, a hopper extending completely across the width of a roofing web, means for moving said web beneath said hopper, a partition extending longitudinally of said hopper and dividing it into two compartments, a reciprocating valve plate disposed in the discharge outlet of said hopper, said valve plate having two sets of spaced staggered openings therein, each set being arranged in a plane extending transversely of the roofing web whereby said valve plate feeds two sets of streams of granular material of different characteristics from said hoppers in vertical planes with the streams fed by one set of openings in staggered relation to the streams fed by the other set, said openings being of such width that the streams of one set overlap the streams of the other set, means for reciprocating said valve plate and a rotary distributor roll positioned below said valve plate and in the paths of the sets of streams discharging from said hopper, said rotary distributor roll combining said sets of streams into a composite stream and discharging said composite stream onto the roofing web.

JOHN ROBERT.

CERTIFICATE OF CORRECTION.

Patent No. 2,037,822.                                                       April 21, 1936.

JOHN ROBERT.

It is hereby certified that error appears in the printed specification of the above numbered patent requiring correction as follows: Page 3, first column, line 10, claim 2, after the syllable "prises" insert the word feeding; and that the said Letters Patent should be read with this correction therein that the same may conform to the record of the case in the Patent Office.

Signed and sealed this 26th day of May, A. D. 1936.

Leslie Frazer (Seal)                                           Acting Commissioner of Patents.